United States Patent [19]

Verderber et al.

[11] 4,352,012

[45] Sep. 28, 1982

[54] HEADER SHEET FOR IMAGE COMMUNICATIONS SYSTEM

[76] Inventors: Joseph A. Verderber, 315 S. Valley Rd.; James A. Fortcamp, 162 Harbor Rd., both of Barrington, Ill. 60010; Ace McInturff, 2401 Simpson, Evanston, Ill. 60201; Denis A. Rose, 1429 Wolftrap Run Rd., Vienna, Va. 22180

[21] Appl. No.: 123,577

[22] Filed: Feb. 22, 1980

[51] Int. Cl.³ .................................................. G06R 19/00
[52] U.S. Cl. ..................................... 235/487; 358/257; 235/494
[58] Field of Search ................ 235/487, 494; 358/257, 358/288

[56] References Cited

U.S. PATENT DOCUMENTS

| | | | |
|---|---|---|---|
| 3,727,032 | 4/1973 | Olmstead | 235/487 |
| 3,808,406 | 4/1974 | Oberg | 235/487 |
| 3,891,492 | 6/1975 | Watson | 235/487 |
| 3,968,350 | 7/1976 | Watson | 235/487 |
| 3,979,839 | 9/1976 | Blanie | 235/487 |
| 4,081,791 | 3/1978 | Pollard | 235/487 |
| 4,187,520 | 2/1980 | Beduchaud | 358/257 |

FOREIGN PATENT DOCUMENTS 1252108  11/1971  United Kingdom ................ 235/487

*Primary Examiner*—Harold I. Pitts

[57] ABSTRACT

A header sheet for use with an automatic image communication transmission system, having regularly spaced hash marks around the border to identify the sheet as a header. Additional markings are in the border to identify the leading edge of the sheet relative to the scan raster of the system, and areas to designate sender and addressee stations by the location of markings relative to the position of the scan raster.

10 Claims, 3 Drawing Figures

HEADER SHEET FOR IMAGE COMMUNICATIONS SYSTEM

BACKGROUND AND SUMMARY OF INVENTION

The present invention relates to image communications systems, and more particularly to a document header sheet for such systems.

Image communications systems are in general quite well known and are in common use. One form of such systems in common commercial use is often referred to as a facsimile system. In such systems, the original document at a sending station is scanned by a transducer to convert the optical or visual image of the document into a train of electrical signals. These electrical signals are transmitted to a receiving station by a telephone line, radio or satellite communication link. At the receiving station, the train of electrical signals are converted into an optical or visual image presentation of the original document.

The present invention relates to a header sheet for documents to be transmitted by an automatic image communication system. It is contemplated that a plurality of documents will be stacked in a document tray for automatic image transmission. Each document will consist of one or more pages, and each document will have as its lead or cover sheet, a header sheet of the present invention. The basic mode of operation of the system provides for automatic feed of each page from the tray in sequence. Each page is delivered to a scanner where its optical or visual contents is scanned and converted by a transducer to an electrical train of data signals representative of the contents of the page. The electrical representation is processed to compress the data, and the data may then be stored. When a communication link is established between the transmitting and intended receiving station, the compressed data is transmitted, and when received it may again be stored and ultimately expanded to its original form and applied to a transducer for conversion to a visual or optical presentation of the original document page.

In the foregoing type of system, a large number of documents may be placed in the receiving tray at one time, and these may all be processed into sending storage. The system is designed to establish a communications link automatically between the sending station and the intended receiving station for each document, and when that link is established for a particular document, that document is then transmitted.

The purpose of the header sheet is to identify for the system, first, the fact that a new document is beginning, second, the identity of the sender or sending station (e.g. for billing purposes), and third, the identity of the intended recipient or receiving station. The foregoing information is presented by data representation for processing by the system. In addition, the header sheet may be used for visual presentation of the sender and addressee that will be transmitted with the document information for reconversion and visual presentation at the receiving station. In order for the header sheet to accomplish the foregoing purposes, it must include identifying means that designates to the system the fact that the sheet is in fact a header sheet. The header sheet must include further identifying means that designate to the system that the header sheet is properly oriented in order that the addressee and sender data will be properly interpreted by the system, and that the data face of the sheet is facing the scanning transducer.

It is therefore one object of the present invention to provide a header sheet for an automatic image communication system.

Another object of the invention is to provide a header sheet for an automatic image communication system presenting data to identify the sender and the addressee station.

Another object of the present invention is to provide a header sheet for an automatic image communication system presenting data to identify that it is a header sheet.

And still another object of the present invention is to provide a header sheet for an automatic image communication system presenting indicia to identify to the system that it is properly oriented for correct interpretation of the data thereon.

Other objects and advantages of the present invention will become apparent from a consideration of the following detailed description of one embodiment of the invention, which is presented as illustrative and to facilitate a complete understanding of the invention.

DESCRIPTION OF THE DRAWINGS

The following detailed description of one embodiment of the invention is had in conjunction with the accompanying drawings, in which like reference characters refer to like or corresponding parts, and wherein:

FIG. 1 is the front face of a header sheet in accordance with the present invention;

DETAILED DESCRIPTION OF ONE EMBODIMENT OF THE INVENTION

Figure 1:
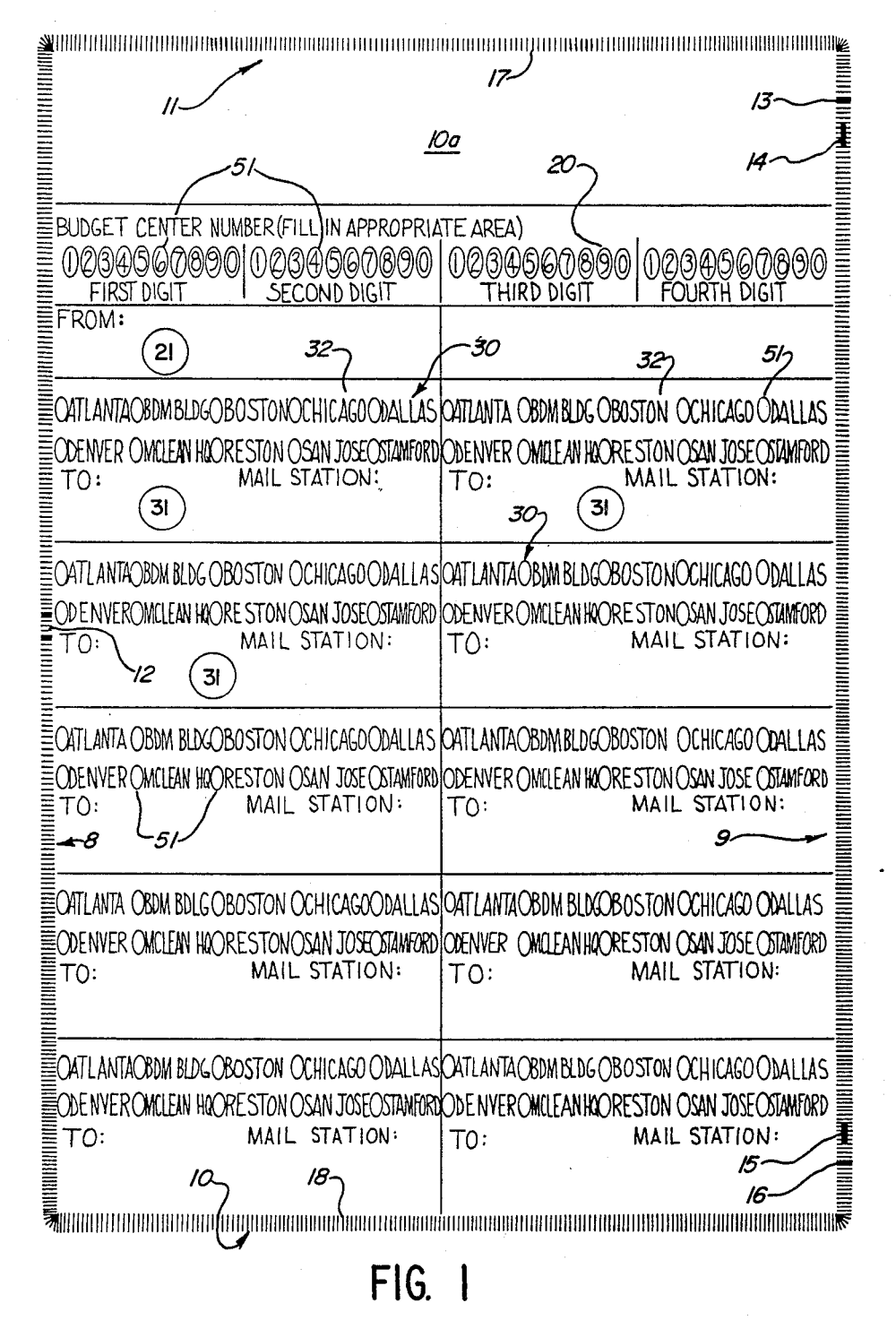
Figure 2:
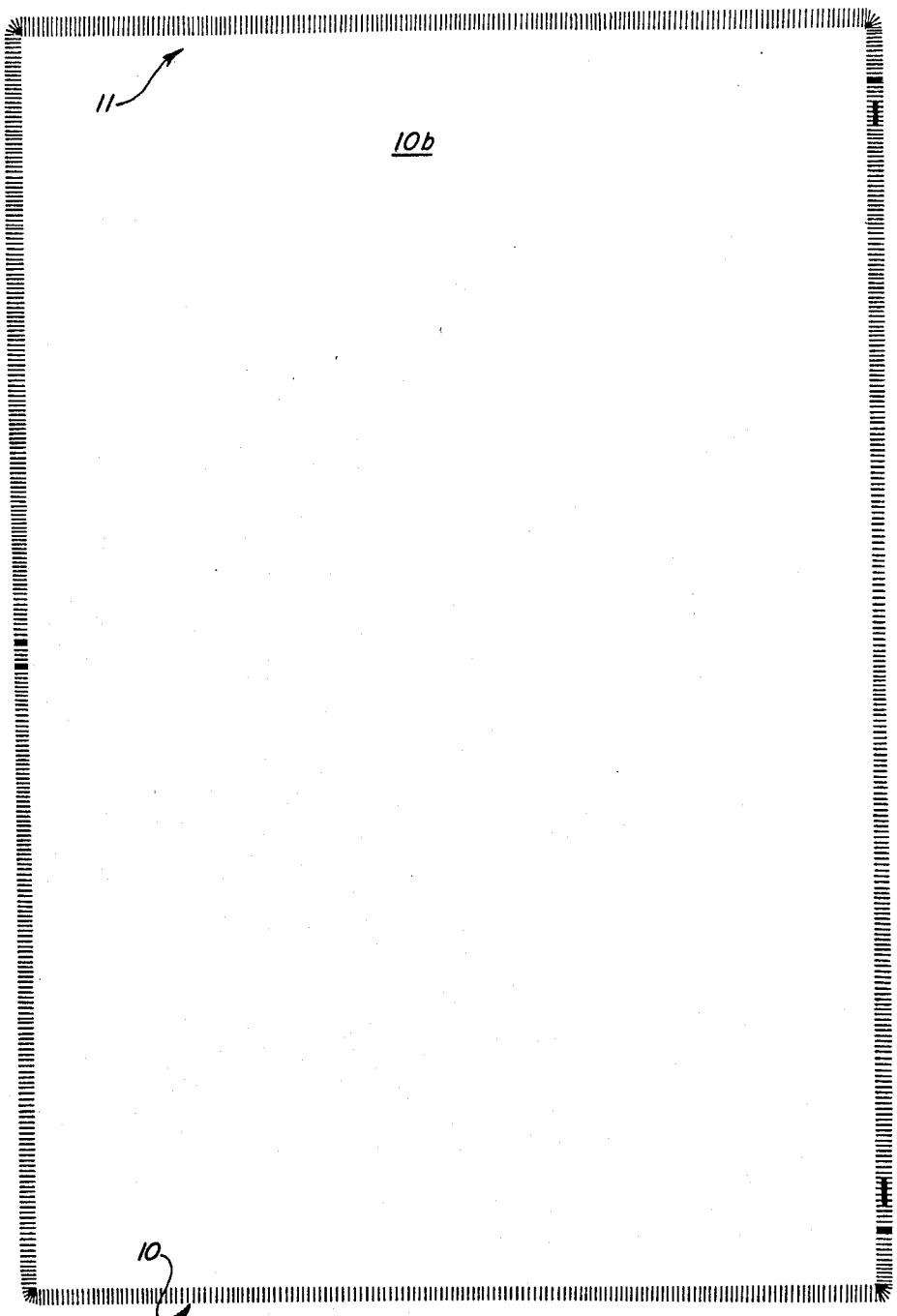
FIG. 2 is the back face of the header sheet of FIG. 1.

An illustrative embodiment of the header sheet 10 of the present invention is shown in FIGS. 1 and 2, FIG. 1 being the front face 10a, and FIG. 2 being the back face 10b. It will be observed first, that both the front and back faces of the header sheet are provided with a complete peripheral border 11 of short, regularly spaced hash marks. Imposed on the border 11 is both a left-right and top-bottom asymmetry. The left side edge 8 is identified by the two closely spaced heavy code bars 12 located near the middle of that side. The right edge 9 is identified by a single heavy code bar 13 near the top and an associated perpendicularly oriented short code bar 14, and by a single heavy code bar 15 near the bottom and an associated perpendicularly oriented short code bar 16. The top is distinguished from the bottom by locating code bars 13 and 14 closer to the top run of hash marks 17 than the code bars 15 and 16 are located to the bottom run of hash marks 18. The back side 10b of the header sheet 10 has a hask mark border identical to that of the front side, having the same code bars and relative orientations.

Thus, considering a scan of the header sheet by a raster having a large number of horizontal or transverse lines that are closely spaced along the vertical or perpendicular axis, no matter what the orientation of the header sheet, the first intelligence scanned is the leading side hask mark border 11. The system is programmed to recognize the hash mark scan as identifying a header sheet.

It is intended that the header sheet should have only one acceptable orientation, and that is with the leading edge being the left side 8. Identity of the correct leading edge is immediately recognized by the scanning system being programmed to recognize the code bar marking 12. Should the header sheet be improperly oriented, so that the leading edge is the right side 9 or the top 17 or the bottom 18, this will be immediately recognized by the scanning system program sensing either the code bars 13, 14 and 15, 16 of the right side 9, or the absence of any code bars in the top and bottom hash mark borders 17 and 18. In the case of a properly oriented header sheet, the system will of course sense the completion of the scan of a header sheet by sensing the trailing edge (right side 9) code bars 13, 14 and 15, 16. It is intended that the system be programmed to signal a misorientation and reject any header sheet whose feed has not been properly oriented. Should the header sheet be fed in the proper orientation, i.e. left edge 8 first, but have the front and back sides reversed so that the scan would be over the back side 10b, a misorientation signal and reject of the header sheet will occur when the scan reaches an essential data area of the sheet and records no data present.

The data area of the header sheet comprises two basic portions: the first is the sender identification area 20 labeled "budget center number"; and the second is the addressee identification area 30. Each data area has an associated visual presentation area: 21 for the sender, and 31 for the addressee. The data areas are coded by their positions in the scan raster for interpretation by the system to control the transmission operation. These data areas comprise a number of defined oval areas 51 to be marked by the user with pen or pencil, in accordance with the information intended. In order to insure against confusion by the system, the preprinted ovals and any guidance or instructional information contained therein are printed in a color to which the scanning transducer is blind, so data will be recognized only when an oval has been marked by pencil or pen. The visual presentation areas 21 and 31 are intended to have visual information written or typed therein, and that information is transmitted as part of the facsimile or image communication for reproduction at the addressee station.

To illustrate usage of the particular form of header sheet shown in FIG. 1, the user, either as an individual or a billing center is identified by a four digit number which must be noted by appropriately marking four ovals 51 in the sender identification data area 20. The system may be programmed to reject transmission unless that is done. In that event, the scanning of this area in the raster pattern would reveal whether the header sheet is properly oriented relative to front and back sides, as mentioned above. In addition, identification of the sender is written or typed in area 21.

The addressee area 30 of the particular header sheet is designed for a choice of ten predetermined addressee stations. In each box 32, the user may mark one addressee station by marking an appropriate data oval 51. Also, the individual addressee is visually identified by typing or writing his name and particular address information in area 31 of the appropriate box 32. If only one copy of the document is to be transmitted, then only one box 30 should be used. A separate box 30 is required for marking each additional addressee station to which a copy of the document is to be transmitted.

Figure 3:
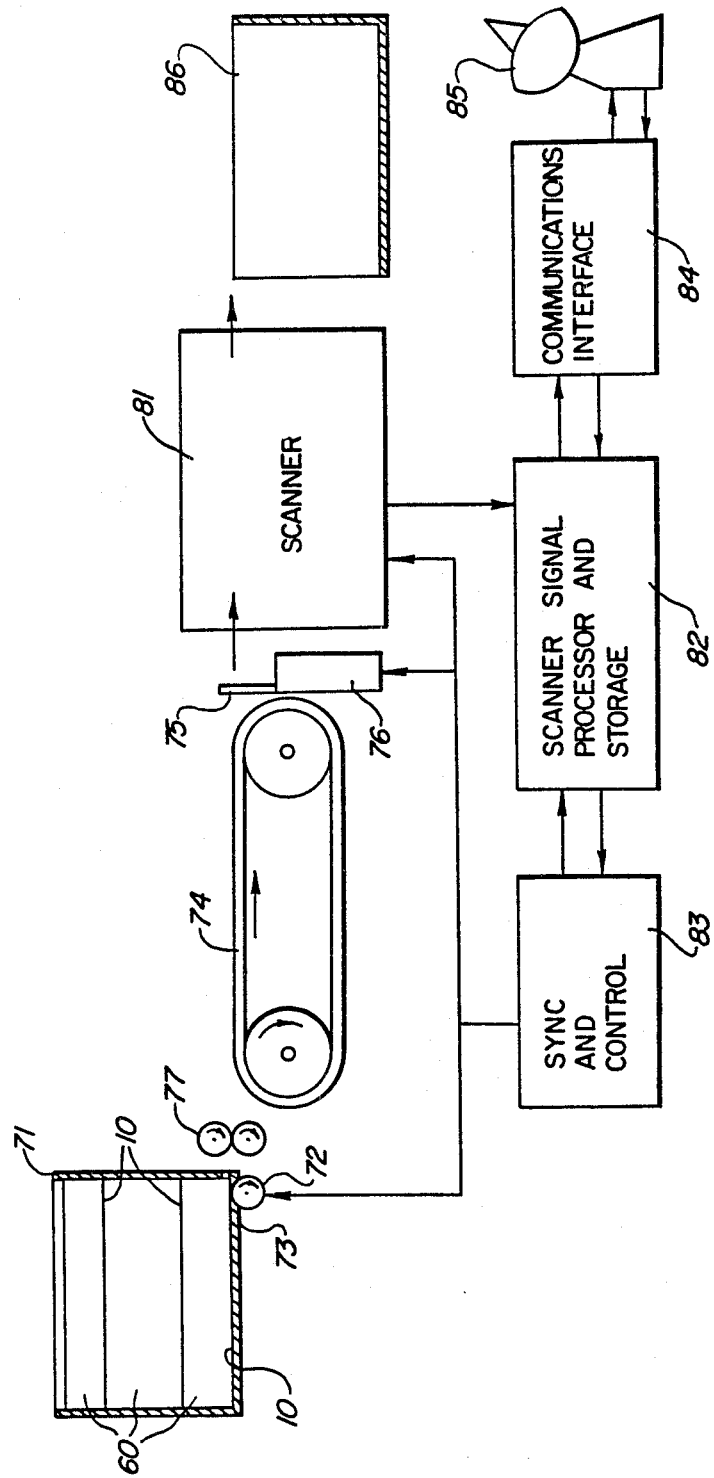
FIG. 3 is a functional block diagram of an image communication transmission system with which the header sheet of FIGS. 1 and 2 is intended to be used.

A facsimile transmission system for utilizing the header sheet 10 as hereinabove indicated is schematically illustrated in FIG. 3. Three multipage documents are there indicated, each by the numeral 60, and each including a header sheet 10. Each document 60 is first assembled in numerical page order with page 1 on top, and all pages face up. A header sheet 10 is completed by the user and placed data face up on top of page 1. The documents 60 with their respective header sheets are then placed in tray 71 face down.

A sheet feeder 72 feeds sheets seriatim from the bottom of tray 71 to conveyor belt 74. A separator 73 kicks back to the tray any additional sheets that may emerge with a bottom sheet, so that only a single sheet at a time is fed by conveyor 74. Each fed sheet is conveyed to registration gate 75 where it is held until an appropriate synchronization time with the scanning raster, when the gate is released by retractor 76. The sheet then advances into the scanner 81. When the sheet has been completely scanned at 81, it is fed to collecting bin 86.

The electrical output of the scanner 81 is fed to the scanner signal processor and storage unit 82. The presence of a header sheet 10 in the scanner is noted by the processor, and its orientation is checked. If the orientation is faulty, further operation is halted until the header sheet is retrieved and properly replaced at the beginning of the document. With a properly oriented header sheet, the data information of the sender and the addressee station is noted by the processor and all the information of the document is received, compressed, and placed in storage. The data identity of the addressee station is fed to the communication interface 84, and that data is utilized to generate appropriate signals to establish a communications link to the addressee station, e.g. via a satellite telephone link through antenna 85. When the communications link is established, the information of the respective document is released from storage and transmitted to the addressee station.

Obviously, synchronization control is required in order to interrelate properly the initiation of aa scanning raster cycle, the release of a document sheet by gate 75, the delivery of a sheet from tray 71, and operation of the scanner signal processor. This is indicated by the synchronization and control circuit 83.

Each document 60 is preceded by its respective header sheet 10. Therefore, the presence of a header sheet in scanner 81 informs the signal processor 82 of the beginning of a new document, and termination of the preceding document.

Accordingly, there is presented by the foregoing description an illustrative specific embodiment of the header sheet of the present invention, and an illustrative schematic showing of one image communication transmission system of the general type for which the invention is intended. It is apparent that many variations and modifications will be apparent to those skilled in the art. For example, the software of the system can be designed to "enable" or "disable" various mark sense positions, depending on the user's needs. Also, a particular mark sense position may be assigned any desired definition. Thus, the information and position of the mark sense locations on the header sheet can be designed for various needs. Also, the image transmission of the name or identification of sender and recipient can obviously be placed anywhere on the header sheet, and can likewise be programmed to be reproduced at any desired position on the facsimile copy at the receiving station. Although described herein in reference to a long distance image communications system, the header sheet of the present invention can be used for local image communications transmission, in conjunction with, or in the absence of long distance transmission. For example, the communication transmission data and image information can be applied to a local receiving printer or duplicator, producing and addressing the requisite number of copies designated by the header sheet, for in-house delivery. Other variations and modifications will become apparent, and such as are embraced by the spirit and scope of the appended claims are contemplated as within the purview of the present invention.

What is claimed is:

1. A document header sheet for an image communication transmission system having means for scanning successive document sheets in a raster of successive spaced substantially parallel lines, said header sheet having:
    (a) a peripheral border, said border having a similar marking pattern along each edge of the sheet identifying said sheet as a header sheet when scanned by said scanning means, and variations in said pattern to identify the edge of such sheet that is the leading edge relative to said raster and;
    (b) specific marking areas within said peripheral border designed for identifying a pre-determined data group for communicating information to the image communication transmission system; and
    (c) marking areas designated for identifying predetermined addressee stations, and means responsive to the detection of a marking in said areas in relation to the position of scan in the raster for generating a signal indicative of one of said addressee stations.

2. A document header sheet as set forth in claim 1, wherein said similar marking pattern comprises a series of closely spaced hash marks arranged substantially perpendicular to each respective edge of the sheet.

3. A document header sheet as set forth in claim 2, wherein said variations in said pattern comprise relatively thick data bars superimposed on said hash marks.

4. A document header sheet as set forth in claim 1, and further including additional marking areas designated for identifying the sender, and means responsive to the detection of a marking in said additional marking areas in relation to the position of scan in the raster for identifying the sender.

5. A document header sheet as set forth in claim 1, the predetermined marking areas designated for identifying specific addressee stations, whereby addressees are identified by the relation of said markings in said areas to the position of scan in said raster.

6. A document header sheet as set forth in claim 5, said sheet having additional predetermined marking areas designated for identifying the particular sender, whereby the sender is identified by the relation of said markings in said additional areas to the position of scan in said raster.

7. A document header sheet for an image communication transmission system having means for scanning successive document sheets in a predetermined scanning pattern, asymmetric means associated with said sheet, identifying said sheet as a header sheet, and means responsive to the relation of said asymmetric means to said scanning pattern for determining the orientation of said header sheet, said sheet having predetermined marking areas identifying data groups for communicating information to the image communication transmission system and predetermined marking areas designated for identifying specific addressee stations, whereby addressees are identified by the relation of the markings in said marking areas to said scanning pattern.

8. A document header sheet as set forth in claim 7, said sheet having additional predetermined marking areas designated for identifying the sender, whereby the sender is identified by the relation of markings in said additional marking areas to said scanning pattern.

9. A document header sheet as set forth in claim 8, including areas designated for inscribing the identity of addressees and for inscribing the identity of the sender for image communication with the document information.

10. A document header sheet as set forth in claim 7, including areas designated for inscribing the identity of addressees for image communication with the document information.

* * * * *